Oct. 9, 1928.

M. CASTRICUM 1,687,321

MARKER FOR CONTINUOUS WEIGHING DEVICES

Filed Jan. 30, 1925  2 Sheets-Sheet 1

INVENTOR.
Martin Castricum
BY Edward C. Naylor
ATTORNEY

Oct. 9, 1928.  
M. CASTRICUM  
1,687,321  
MARKER FOR CONTINUOUS WEIGHING DEVICES  
Filed Jan. 30, 1925  
2 Sheets-Sheet 2
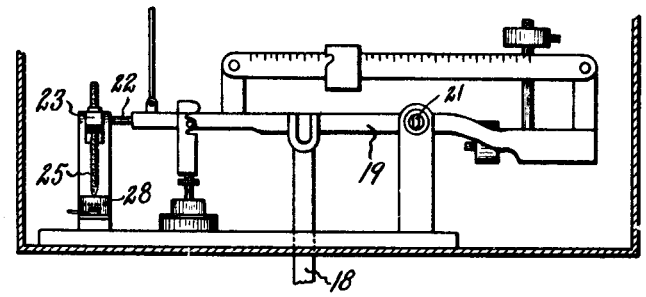
Fig. 3
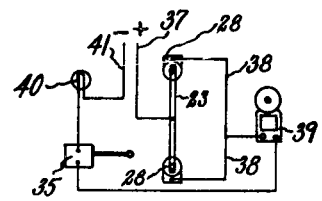
Fig. 9.
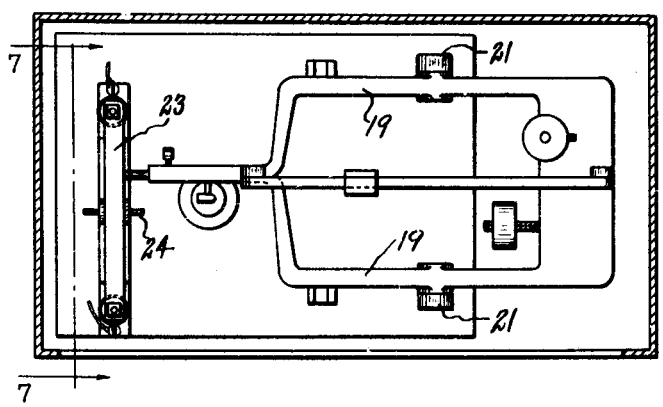
Fig. 4.
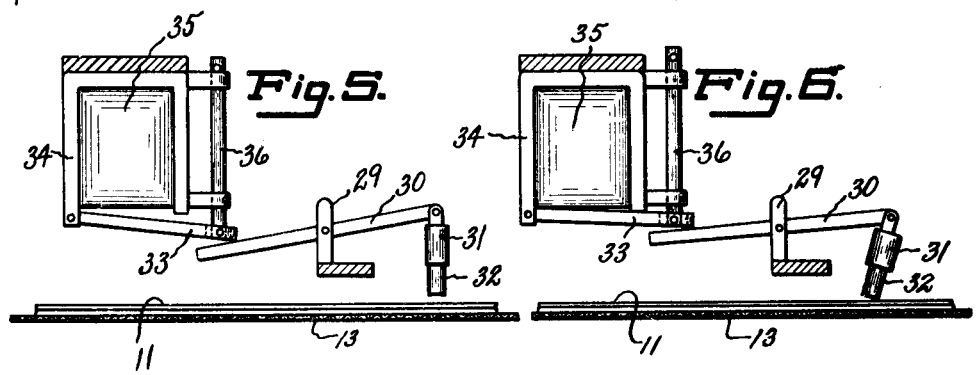
Fig. 5.  Fig. 6.
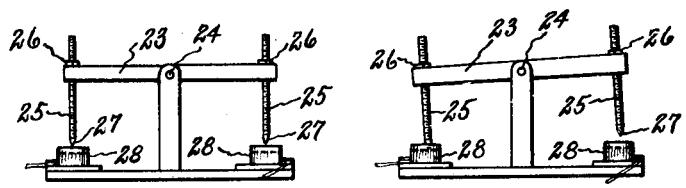
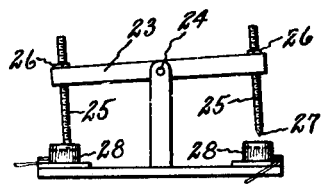
Fig. 7.  Fig. 8.
INVENTOR.  
Martin Castricum  
BY Edward C. Taylor  
ATTORNEY.

Patented Oct. 9, 1928.

1,687,321

UNITED STATES PATENT OFFICE.

MARTIN CASTRICUM, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

MARKER FOR CONTINUOUS-WEIGHING DEVICES.

Application filed January 30, 1925. Serial No. 5,699.

This invention relates to continuous weighing apparatus, and has for its object the provision of a marking device for attachment to such an apparatus which will indicate directly on the material which has been weighed any portion thereof which is outside the tolerances previously determined upon, and which therefore must be discarded or otherwise specially handled in subsequent manufacturing operations.

Referring to the drawings,

Fig. 3 is a side elevation of the control for the marking device;

Fig. 4 is a plan view thereof;

Fig. 5 is a sectional detail of the marking device in inactive position;

Fig. 6 is a similar detail, but showing the device in operation;

Fig. 7 is a detail on line 7—7 of Fig. 4, with the parts in positions corresponding to Fig. 5;

Fig. 8 is a similar detail, but corresponding in position of the parts to Fig. 6; and Fig. 9 is a wiring diagram.

Figure 1:
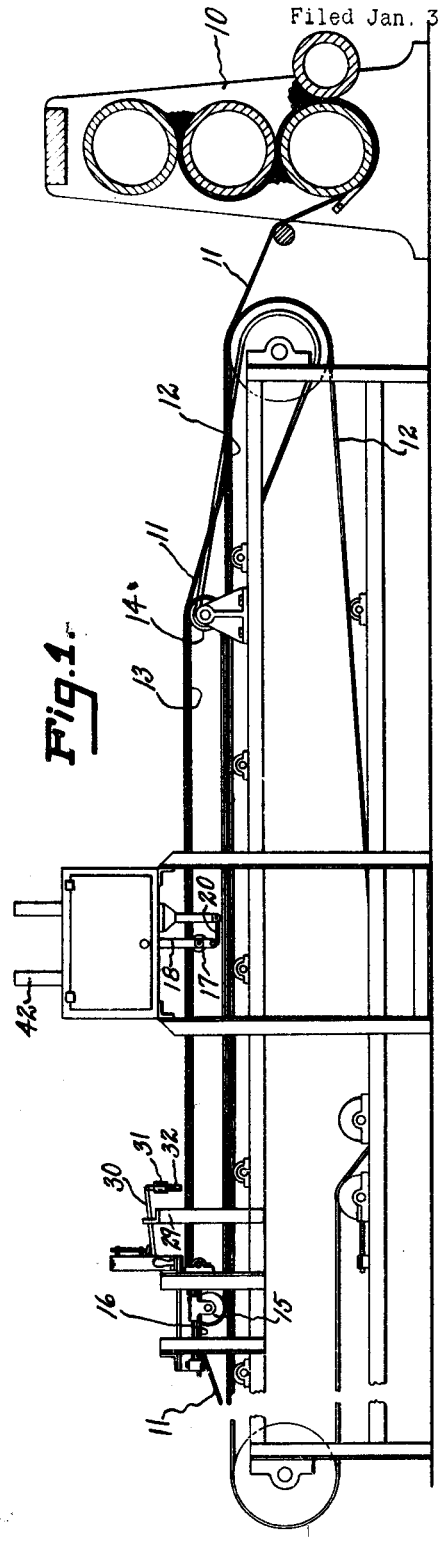
Fig. 1 is a side elevation of a weighing device with the marking device attached.
Figure 2:
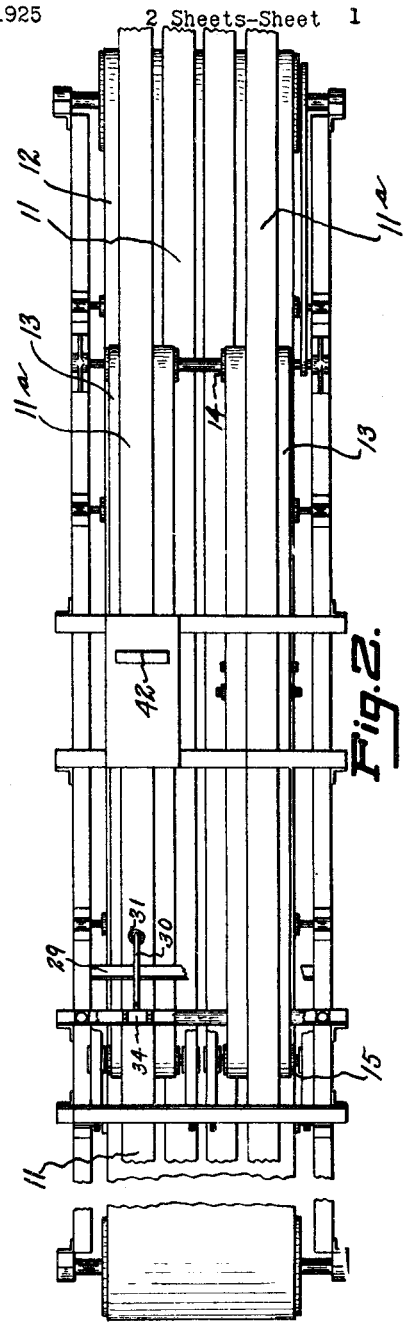
Fig. 2 is a plan view of a portion thereof.

The invention has been illustrated as applied to a weighing scale for weighing continuously rubber strips such as are used for the treads of automobile tires, but it is of course not restricted to such use. The continuous strips are made upon a rubber calender 10 which forms them to the desired thickness and width. The strips 11 so formed are received on a belt conveyor 12, the sample strips 11ª to be weighed being each elevated onto a belt conveyor 13 stretched tightly between a fixed pulley 14 and a pulley 15 movable by a usual belt tightening device 16. The center of this elevated conveyor (of which there are two shown in the drawings) rests upon a roll 17 (Fig. 1) which is supported on a link 18 (Fig. 3) from the scale beam 19. A linkage 20 may be used to prevent swaying of the roll. The scale mechanism need not be described in detail, as it in itself forms no part of my invention.

The scale beam 19, which is pivoted at 21 (Figs. 3 and 4), carries preferably at one end a projecting rod 22, pivotally engaging a rocker 23 swinging upon a bearing 24. At each end of the rocker are electrical contact members 25 formed as screw threaded rods held in place by lock nuts 26. The points 27 of these rods dip into cups 28 containing a small quantity of mercury. The electrical connections of these cups will be described after referring to other parts with which they cooperate.

Mounted towards the delivery end of the belts 13 (Figs. 1, 5, and 6) are brackets 29 supporting levers 30. Since one of these levers and attendant parts constituting a marking device is provided for each weighing apparatus a description of one will suffice. Each lever carries on one end a freely swinging holder 31 for a crayon or other marking means 32. The other end of the lever bears against an armature 33 pivoted to one side of the frame 34 of a solenoid 35. A sliding rod 36 guides the armature in its travel. When the armature is down—when the solenoid is not energized—its weight and that of the sliding rod 36 holds the lever tilted to hold the crayon clear of the strip, but when electrical current is passed through the solenoid this weight is removed (Fig. 6) and the crayon permitted to descend lightly upon the material.

One side 37 (Fig. 9) of an electrical circuit is connected to the rocker 23, and through it to the rods 25. The two cups 28 are joined together by wires 38, the common circuit thus formed being connected in series with a bell 39, the solenoid 35, and a light 40, being finally connected to the second side 41 of the main circuit. It will be apparent that if the material runs either light or heavy the scale beam 19 will be displaced and rocker 23 tilted to one side or the other, causing an electrical circuit through the proper mercury cup and actuating the various electrical devices. The two cups have been electrically joined together, thus causing identical actuation of the solenoid and the signal devices, since the main purpose is to mark material which is outside of tolerance, and there is in this regard no difference between light and heavy stock. The bell and light are signal devices to call attention of the calender man to the necessity of adjustment. As the degree of adjustment depends upon the amount of error, he will look at the scale indicator 42 in any case, and therefore no difference has been made in the signals for light or heavy stock. If desired, however, these signal devices could be placed in the separate circuits leading from the two mercury cups instead of in the joint circuit, in which case they would indicate the qualitative nature of the error, although not its quantitative nature. Furthermore, these signal devices may be dispensed with entirely, leaving the calender man to watch the scale indicator. The use of one or both is, however, preferred.

Having thus described my invention, I claim:

1. The combination of means for forming material in continuous length, means for determining the weight of the material per unit of length, and means automatically controlled by the weighing means for marking directly on the material to indicate such portions thereof as are outside a predetermined tolerance.

2. In combination with the scale beam of a continuous weighing device, a rocking member, connections between the scale beam and the member so that the latter will be tilted in one direction or the other depending on whether the scale beam is displaced up or down, electrical contacts operated by the rocking member when tilted a predetermined amount in either direction, and means controlled by the contacts for marking on the material being weighed whenever the displacement of the scale beam is sufficient to operate the contacts.

3. A marking device for indicating upon material a departure from predetermined tolerances of weight, comprising weighing mechanism, a pivoted crayon holder, a crayon therein, and means for pressing the crayon holder against the material by the operation of a weighing mechanism, the holder being adapted to tilt so that the crayon is pressed against the material with a light and uniform pressure.

MARTIN CASTRICUM.